United States Patent
Gerraty et al.

(10) Patent No.: US 7,233,975 B1
(45) Date of Patent: Jun. 19, 2007

(54) PRIVATE CONFIGURATION OF NETWORK DEVICES

(75) Inventors: Simon J. Gerraty, Mountain View, CA (US); Philip A. Shafer, Raleigh, NC (US); Robert P. Enns, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 885 days.

(21) Appl. No.: 10/223,813

(22) Filed: Aug. 19, 2002

(51) Int. Cl.
*G06F 15/16* (2006.01)
*G06F 15/167* (2006.01)
*G06F 17/30* (2006.01)

(52) U.S. Cl. .............. 709/213; 709/214; 709/215; 709/216; 709/220; 707/8

(58) Field of Classification Search ........ 709/213–216, 709/220; 707/8
See application file for complete search history.

(56) References Cited

U.S. PATENT DOCUMENTS

| | | | | |
|---|---|---|---|---|
| 6,014,669 A * | 1/2000 | Slaughter et al. ........... 707/10 |
| 6,141,759 A * | 10/2000 | Braddy ..................... 726/14 |
| 6,240,414 B1 * | 5/2001 | Beizer et al. ............... 707/8 |
| 6,480,955 B1 * | 11/2002 | DeKoning et al. ......... 713/100 |
| 6,529,905 B1 * | 3/2003 | Bray et al. .................. 707/8 |
| 6,587,124 B1 * | 7/2003 | Slaby ........................ 715/735 |
| 6,907,603 B2 | 6/2005 | Scott |
| 6,996,372 B2 * | 2/2006 | Noerpel et al. .......... 455/67.11 |
| 6,996,672 B2 * | 2/2006 | Lubbers et al. ............ 711/114 |
| 7,043,537 B1 * | 5/2006 | Pratt ........................ 709/220 |
| 7,055,148 B2 | 5/2006 | Marsh et al. |
| 7,065,637 B1 * | 6/2006 | Nanja ........................ 713/1 |
| 7,130,870 B1 * | 10/2006 | Pecina et al. .............. 707/203 |
| 2002/0161860 A1 | 10/2002 | Godlin et al. |
| 2002/0162049 A1 | 10/2002 | Takamoto et al. |
| 2002/0194015 A1 * | 12/2002 | Gordon et al. ............. 705/1 |
| 2003/0037040 A1 * | 2/2003 | Beadles et al. ............. 707/1 |
| 2003/0212983 A1 | 11/2003 | Tinker |
| 2003/0225866 A1 | 12/2003 | Hudson |
| 2004/0032837 A1 * | 2/2004 | Visser ...................... 370/254 |
| 2005/0138375 A1 * | 6/2005 | Sadjadi ..................... 713/167 |
| 2006/0168160 A1 * | 7/2006 | Pratt ........................ 709/220 |

OTHER PUBLICATIONS

U.S. Appl. No. 10/392,201, entitled "Application of a Configuration Patch to a Network," filed Mar. 17, 2003.
U.S. Appl. No. 10/339,719, entitled "Private Configuration of Network Devices," filed Jan. 9, 2003.

* cited by examiner

*Primary Examiner*—Nathan Flynn
*Assistant Examiner*—Joshua Joo
(74) *Attorney, Agent, or Firm*—Shumaker & Sieffert, P.A.

(57) ABSTRACT

Techniques are described that configure a router in a configuration mode specified by a client. For example, a client may request to configure the router in a private configuration mode. In response to the command, a management module creates a private database. A client may edit the configuration data of the private database. The client may edit the private database without interference from other clients that may also be editing configuration data of the router. Management server module updates the committed database with edited private database, and the router begins to operate in accordance with the updated configuration data.

33 Claims, 9 Drawing Sheets

PRIVATE CONFIGURATION OF NETWORK DEVICES

TECHNICAL FIELD

The invention relates to computer networks, and more particularly, to configuring devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Conventional routers typically include a mechanism, referred to herein as a management interface, for directly or remotely configuring the router. By interacting with the management interface, various clients, such as human users and automated scripts, can perform a vast amount of configuration tasks. For example, the clients may configure interface cards of the router, adjust parameters for the supported network protocols, specify the physical components within the routing device, modify the routing information maintained by the router, access software modules and other resources residing on the router, and the like.

In some routers, the management interface allows a client to configure the present configuration of the router using a commit-based model. In a commit-based model, a client issues one or more configuration commands, and then directs the management interface to apply the commands by issuing a "commit" command. Typically, the client may direct the management interface to disregard the commands by issuing a "rollback" command.

For example, a client typically places the router in a configuration mode, often by issuing an edit command to the management interface. In this mode, the management interface may essentially "lock" the router, and reject any configuration commands from other clients. Next, the client typically issues a number of commands directing the management interface to modify the present configuration, followed by a commit command that directs the router to apply the commands. Upon receiving the commit command, the management interface exits the configuration mode, and applies the changes to the present configuration, thereby adjusting the operation of the router. Finally, the management interface exits the configuration mode, effectively "unlocking" the router and allowing configuration by another client.

As the complexity of computing networks has increased, there has been an increasing need for routers and other network devices to support concurrent configuration by multiple clients. Consequently, some devices allow multiple clients to concurrently issue configuration commands. In other words, the management interface of such a device does not "lock" the configuration of the device to a single client, but receives configuration commands from multiple clients while operating in configuration mode. When the management interface receives a commit command from any of the clients providing commands, the management interface applies all of the pending changes from all of the concurrent clients to the present configuration. These techniques can be problematic in that partial changes made by a client may be committed in response to a commit command from another client. Furthermore, uncommitted changes made by a client may be lost when another client issues a "rollback" command.

SUMMARY

In general, the invention is directed to techniques for allowing multiple clients to concurrently configure a network device. In particular, the clients can concurrently issue configuration commands to the network device, without the risk of having those partially completed modifications committed by another client or having the commands lost due to a rollback command from another client.

Consistent with the principles of the invention, a management module of the network device supports a command syntax in which a configure command may optionally specify a particular configuration mode. More specifically, the configure command may include an additional parameter that specifies an exclusive mode or private mode. Upon receiving a configure exclusive command, the management module locks the network device and allows a single client to make changes to the present configuration.

In response to a configure private command, the management module places the device into a private configuration mode in which the client can issue configuration commands to the device. The management module does not lock the device, and allows other clients to concurrently issue configuration commands in a similar private configuration mode.

In particular, for each client that issues a configure private command, the management module creates a respective private data source from a committed data source that stores the present configuration of the device. The management module applies configuration commands from the clients to their respective private data sources. Upon receiving a commit command from a client, the management module inserts the edited data of the private data source into configuration data of the committed data source. In particular, the management module generates a "patch" representing the changes to the private data source, and applies the patch into the committed data source.

When applying the patch, the management module resolves any conflicts that may exist between the private data source being committed and changes to the committed data source made by other users while the private data sources were being edited. If a client issues a rollback command when in private configuration mode, only the respective private data source is discarded and refreshed. Consequently, the client may edit the private data source without risk of premature commitment of the changes, or loss of the changes, due to another client.

In one embodiment, a method comprises receiving, from plurality of clients, commands to configure a committed data source. The committed data source stores current configuration data for a network device. The method further comprises creating a respective private data source from the committed data source for each client in response to the commands. The method also includes independently merging each of the private data sources into the committed data source upon receiving commit commands from the respective clients. The method may also comprise identifying any differences between the respective private data source and the committed data source, and updating the committed data source in accordance with the identified differences.

In another embodiment, a method comprises receiving, from a plurality of clients, commands to configure a committed data source. The committed data source stores current configuration data for a network device. The method further comprises parsing the commands to identify a configuration mode. The method also includes each of the clients editing configuration data of the network device in the respective identified configuration mode. The configuration mode may be a private configuration mode, an exclusive configuration mode, or a default configuration mode.

In another embodiment of the invention, a method comprises receiving a command from a client to enter a private configuration mode in a network device. The method further comprises creating a private data source in response to the command issued by the client. The private data source may contain a copy of a committed data source and an associated copy of start up data.

In another embodiment, the invention is directed to a network device comprising a committed data source that contains configuration data that the network device operates in accordance with. The network device further comprises a management module to generate a private data source from the committed data source in response to a command that specifies a private configuration mode. The network device may further comprise a set of data that represents the comparison of the configuration data of the private data source with the configuration data of the committed data source. The network device may also have a shared data source that contains a copy of configuration data of the committed data source, and that multiple clients may edit concurrently.

In another embodiment, a computer-readable medium comprises instructions to cause a processor to receive from a plurality of clients, commands to configure a committed data source that stores current configuration data for a network device. The computer-readable medium also comprises instructions to cause a processor to create for each client a respective private data source from the committed data source in response to the commands. Furthermore, the computer-readable medium also comprises instructions to cause a processor to independently merge each of the private data sources into the committed data source upon receiving commit commands from the respective clients.

In another embodiment, a method comprises placing a router into a private configuration mode in response to a command from a client. The method further comprises copying a committed data source to a private data source. The data of the private data source is edited by inputting configuration data from the client. The method also includes comparing the edited configuration data of the private data source with a set of start up data. The method further includes updating the configuration data of the committed data source with the edited data of the private data source.

In another embodiment, a system that comprises a committed data source that stores current configuration data of a network device. The system further comprises a shared data source that stores a copy of the committed data source, and that allows a plurality of clients to access the configuration data simultaneously. The system also includes a set of private data source, each storing a copy of the configuration data of committed data source. The system also includes a management module that allows clients to enter a configuration mode and make changes to one of the data sources.

The invention may provide one or more advantages. For example, the management module of the network device supports a flexible command syntax in which a client may optionally specify one of a number of different configuration modes. The client may elect to configure the network device to the exclusion of others. Alternatively, the client may elect to configure the device in a private mode in which multiple clients can concurrently configure edit respective private data sources. Consequently, the client may edit the private data source without risk of premature commitment of the changes, or loss of the changes, due to another client.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
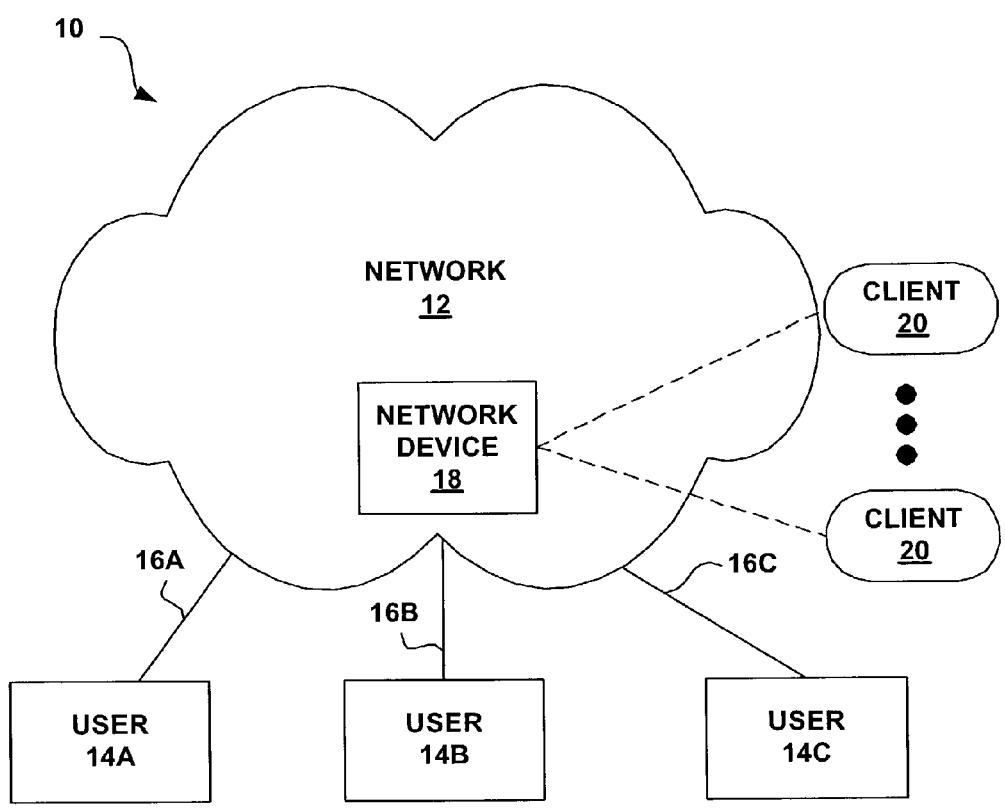
FIG. 1 is a block diagram illustrating an example computer network having a network device that supports a private configuration mode consistent with the principles of the invention.

FIG. 1 is a block diagram illustrating an example computer network 10 in which network device 18 supports a private configuration mode consistent with the principles of the invention. Computer network 10 comprises a network 12 that may be accessed by users 14A to 14C (collectively users 14) via one of links 16A to 16C (collectively links 16). Each of users 14 represents an entity, such as an individual or an organization, that accesses network 12 to communicate with other users connected to network 12. Links 16 may be Ethernet or other network connections.

Network device 18 represents any device operating within computing network 10, such as a network hub, network switch, network router, or the like. Network device 18 may include an interface that allows various clients 20, such as human users and automated scripts, to configure network device 18 by specifying protocols to follow, physical arrangements of hardware, or the like. For example, network device 18 may be a network router, and clients 20 may specify configuration information to configure interface cards of the router, adjust parameters for the supported network protocols, specify the physical components within the routing device, modify the routing information maintained by the router, access software modules and other resources residing on the router, and the like.

As described in detail, network device 18 supports a command syntax in which a configure command may optionally specify a particular configuration mode. More specifically, the configure command may include an additional parameter that specifies an exclusive mode or a private mode. Upon receiving a configure exclusive command from one of clients 20, network device 18 locks the primary configuration, and only allows the requesting client to make changes to the present configuration.

In response to a configure private command from one of clients 20, network device 18 enters a private configuration mode in which multiple clients 20 can issue configuration commands to device 18. In particular, for each of clients 20 that issues a configure private command, network device 18 creates a respective private data source from a committed data source that stores the present configuration of the device. Network device 18 applies configuration commands from clients 20 to their respective private data sources. Upon receiving a commit command from any given one of clients 20, network device 18 merges the edited data of the private data source into configuration data of the committed data source. In particular, network device 20 generates a "patch" representing the changes to the private data source, and applies the patch into the committed data source.

When applying the patch, network device 20 resolves any conflicts that may exist between the private data source being committed and any changes to the committed data source made by other clients 20 while the private data source was being edited. If one of clients 20 issues a rollback command when in private configuration mode, only the respective private data source created for the client is discarded and refreshed. Consequently, clients 20 may edit the private data source without risk of premature commitment of the changes, or loss of the changes, due to another one of clients 20.

Figure 2:
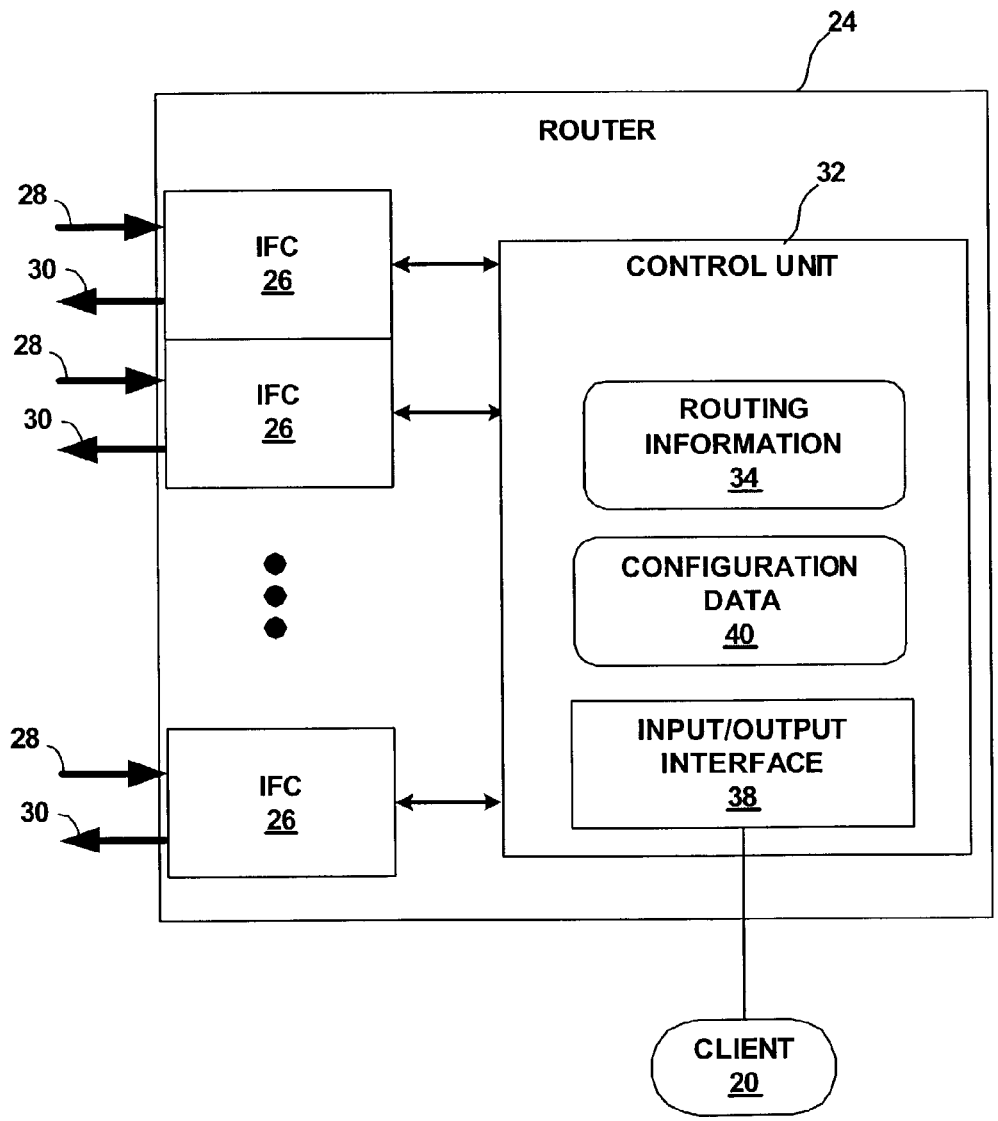
FIG. 2 is a block diagram illustrating an example network router that supports a private configuration mode consistent with the principles of the invention.

FIG. 2 is a block diagram illustrating an example network router 24 that supports a private configuration mode consistent with the principles of the invention. Router 24 includes a set of one or more interface cards (IFCs) 26 that receive and send packets via network links 28 and 30, respectively. IFCs 26 are typically coupled to network links 28, 30 via one or more interface ports.

Router 24 further comprises a control unit 32 that maintains routing information 34. Routing information 34 describes the topology of network 12 and, in particular, routes through network 12. Routing information 34 may include, for example, route data that describes various routes within network 12, and corresponding next hop data indicating appropriate neighboring devices within network 12 for each of the routes. Routing information 34 is periodically updated to accurately reflect the topology of network 12. In general, router 24 receives a packet via inbound network link 28, control unit 32 determines the destination address of the packet and outputs the packet on an outbound network link 30 based on the destination.

Control unit 32 may receive configuration input from a client 20 via an input/output (I/O) interface 38. I/O interface 38 may be a command line interface (CLI) or other suitable interface, for processing user or script-driven commands. Control unit 32 may store the configuration input received from client 20 as configuration data 40, which may take the form of a text file, such as an ASCII file. Alternatively, control unit 32 may process the configuration input and generate configuration data 40 in any one of a number of forms, such as one or more databases, tables, data structures, or the like.

In response to receiving a configure command, a management module of router 24 may parse the command, and place router 24 in a configuration mode for receiving configuration data 40 from client 20. Configuration data 40 may take the form of one or more commands for adding new settings to the current configuration of the router, commands for deleting or modifying existing settings of the current configuration, or combinations thereof. Router 24 may further parse configuration data 40, input from client 20, and resolve the references to appropriately configure router 24. Upon receiving a commit command, the management module applies configuration data 40 to router 24.

In this manner, a syntax for the configuration command may be expressed as follows:

configure [configuration mode], where configuration mode may specify private or exclusive, and is optional.

The following pseudocode illustrates an exemplary use of a configure command in accordance with the invention:

user@host> configure private
user@host# set system host-name router_25
user@host# commit In the above pseudocode client 20 issues a configure private command directing router 24 to enter a configuration mode and, more particularly, to enter a private configuration mode. While in the private configuration mode, client 20 then issues a command to modify the current host name of router 24, i.e., set system host-name. Finally, client 20 issues a commit command directing router 24 to verify and accept the changes.

Figure 3:
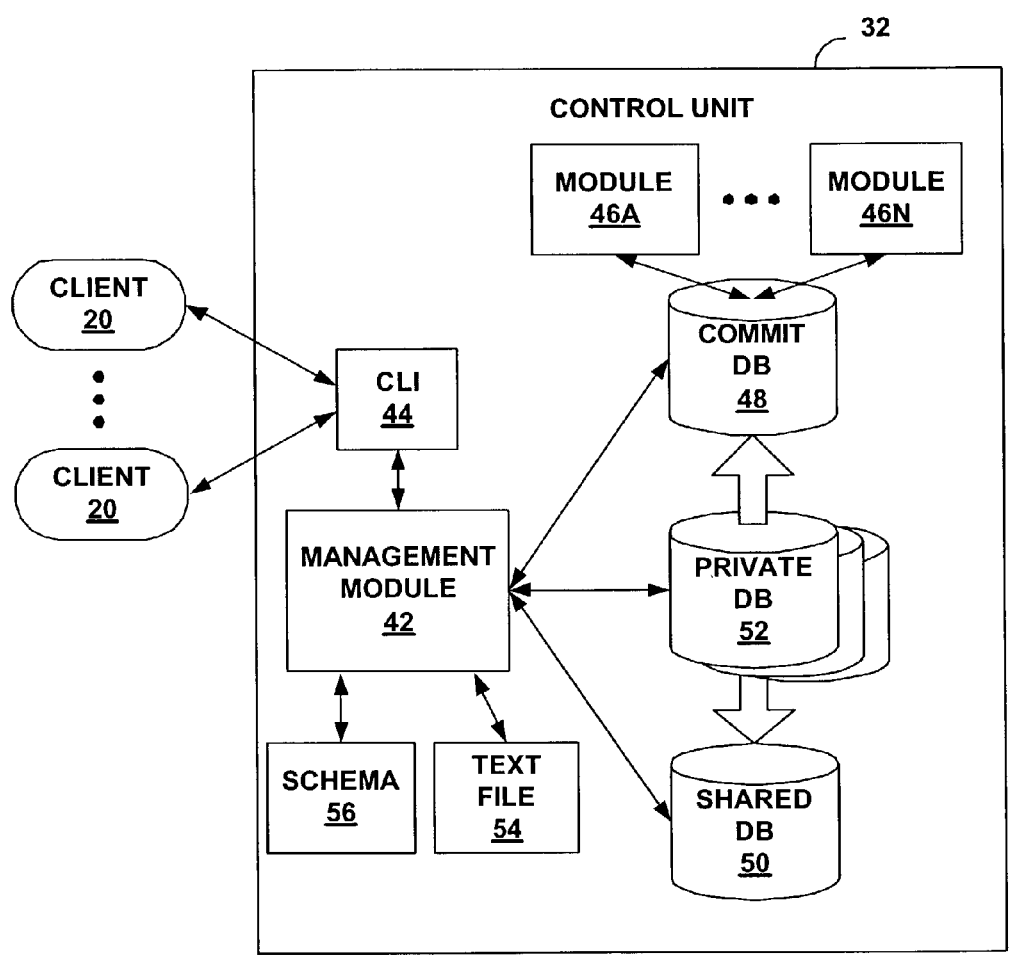
FIG. 3 is a block diagram illustrating an example control unit 32 that supports operation in a private configure mode consistent with the principles of the invention.

FIG. 3 is a block diagram illustrating an example control unit 32 that supports operation in a private configure mode consistent with the principles of the invention. Control unit 32 comprises a management module 42 that communicates with one or more of clients 20 via a command line interface (CLI) 44. CLI 44 serves as a daemon process that listens for requests from clients 20. Upon receiving a request from one of clients 20, CLI 44 may relay the request to management module 42. However, CLI 44 may give way to direct communication between client 20 and management module 42.

Control unit 32 may further include one or more software modules 46A to 46N, collectively referred to as software modules 46. Software modules 46 represent threads of execution, and typically execute within an operating environment provided by an operating system. Software modules 46 may, for example, include a routing protocol module to administer protocols supported by router 24, a chassis module to account for the physical components of router 24, a device configuration module to control the physical configuration of router 24 or the like.

Control unit 32 may include a committed data source (referred to as committed database (COMMIT DB) 48 that stores a present configuration of router 24. In other words, router 24 operates in accordance with configuration information stored in committed database 48. Control unit 32 may further include a shared data source (referred to as shared database (SHARED DB) 50 that contains a copy of the configuration data of committed database 48, and is typically used for editing the configuration without impacting operation of router 24. For example, clients 20 may access shared database 50 simultaneously and each of clients 20 may make changes to the configuration data stored in shared database 50.

Management module 42 may receive a command from one of clients 20 to configure router 24. Management module may parse the command from client 20, and place router 24 in the configure mode requested by client 20. Router 24 may be configured using one of several different configuration modes, such as a default configuration mode (referred to as configure mode), an exclusive configuration mode, a private configuration mode, or the like.

By issuing a configuration command without specifying a configuration mode, management module 42 operates in the default configuration mode and allows clients 20 to concurrently edit configuration data in shared database 50. If one of clients 20 issues a commit command, all of the changes, complete or incomplete, made by clients 20 may be committed to committed database 48.

In exclusive configuration mode, management module 42 allows one of clients 20 to edit configuration data of shared database 50. However, when configuring in exclusive configuration mode, shared database 50 may be locked, allowing for only one client 20 at a time to edit configuration data of shared database 50. The lock may further prevent client 20 from creating any interference from other clients 20 when issuing a commit or rollback command. When receiving a commit command from the client 20 for which an exclusive lock has been granted, management module 42 copies shared database 50 to the committed database 48.

In private configuration mode, management module 42 allows clients 20 to edit configuration data in respective private data sources, referred to as private databases (PRIVATE DB) 52. For each of clients 20 that issue a configure private command, management module 42 creates a respective private database 52, each of which represent a copy of committed database 48 created at the time the management module 42 receives the corresponding configure command. In addition, management module 42 may generate a copy of a configuration text file 54, such as an ASCII configuration file, which may contain configuration data that is used by control unit 32 during restart. Upon receiving a commit command from any given one of clients 20, management module 42 generates a patch by comparing changes made to private database 52 with the configuration data of text file 54. Management module applies the patch into committed database 48, and resolves any conflicts that may exist between private database 52 being committed and any changes to the committed database 48 made by other clients 20 while the private database was being edited.

Independent of the configuration mode entered by client 20, upon issuing a commit command, management module 42 validates the updated configuration. In one example, management module 42 determines whether the configuration data conforms to a schema 56 of the committed database. More specifically, schema 56 describes a proper syntax to which the configuration information must conform in order to be compatible with all of software modules 46. In addition, management module 42 may direct software modules 46 to validate specific parameters or settings within the updated configuration data.

Based on the validation, management module 42 may either reject the pending configuration data, or accept the pending configuration data. For example, management module 42 may accept the pending configuration data, and update the configuration data of committed database 48 to reflect the changes made by client 20. Management module 42 may then proceed to notify software modules 46 that committed database 48 contains updated configuration information. Software modules 46 may retrieve the new configuration data from committed database 48, and router 24 may begin to operate in accordance with the new configuration data.

Figure 4:
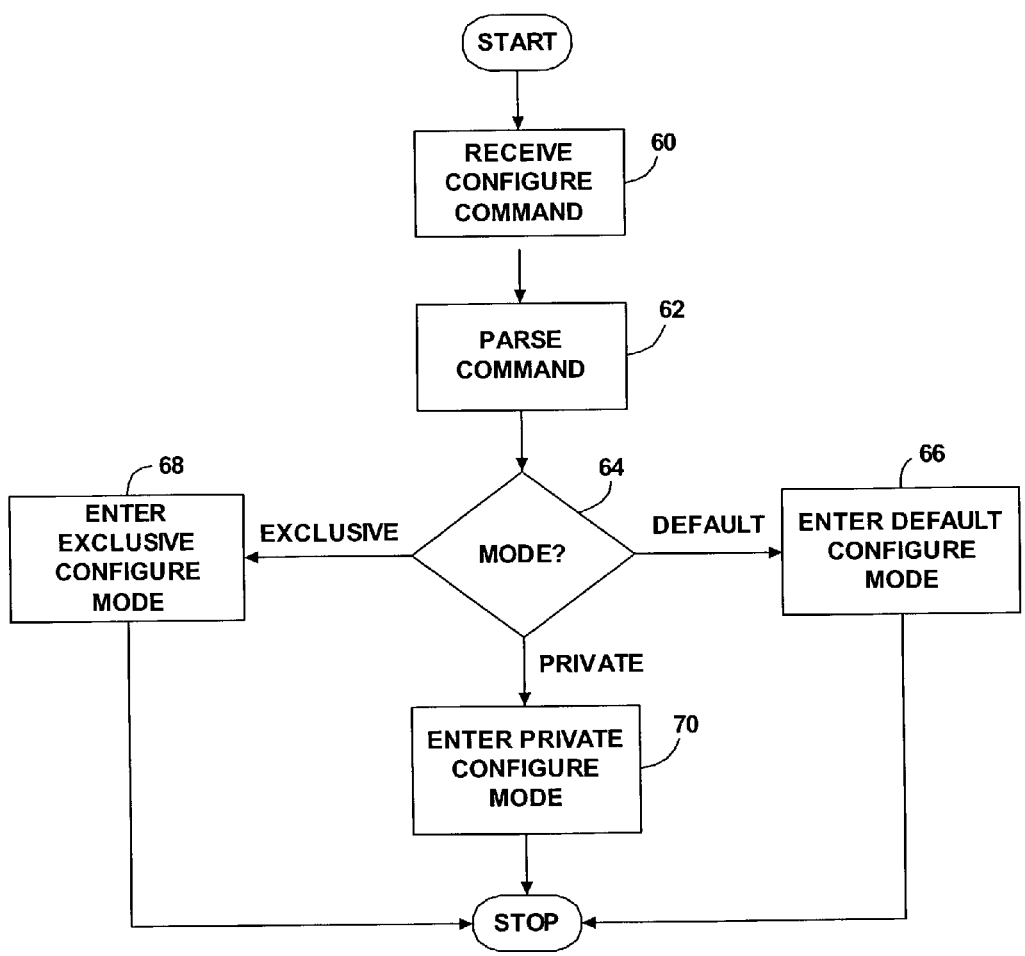
FIG. 4 is a flowchart illustrating a management module entering a configuration mode in response to a configure command from a client.

FIG. 4 is a flowchart illustrating management module 42 entering a configuration mode in response to a configure command from one of clients 20. Initially, management module 42 receives a command from one of clients 20 to configure router 24 (60). In response to receiving a configure command from one of clients 20, management module 42 may parse the command to determine which configuration mode to operate in (62, 64). When the configure command includes no additional parameters that specify a particular configuration mode, management module 42 operates in a default configure mode (66). In this mode, management module 42 allows clients 20 to concurrently edit shared database 50. If one of clients 20 issues a commit command, all of the changes, complete or incomplete, made by clients 20 may be committed to committed database 48.

When the configure command includes the additional parameter exclusive, management module 42 operates in an exclusive configure mode (68). In exclusive configuration mode, management module 42 allows only one of clients 20 to edit configuration data of shared database 50 at a time. Allowing only one client 20 at a time to edit shared database 50 may prevent interference between client 20 in the exclusive configure mode and other clients 20 in different configuration modes. When receiving a commit command from the client 20 in the exclusive configure mode, management module 42 copies shared database 50 to committed database 48.

When the configure command includes the additional parameter private, management module 42 operates in a private configure mode (70). In private configure mode multiple clients 20 may concurrently issue configuration commands to management module 42. In particular, for each of clients 20 that issues a configure private command, management module 42 creates a respective private database 52 from committed database 48 that stores the present configuration of the device. Management module 42 applies configuration commands from clients 20 to their respective private databases 52. Upon receiving a commit command from any given one of clients 20, management module 42 merges the edited data of the respective one of private database 52 into configuration data of committed database 48. In particular, management module 42 generates a "patch" representing the changes to private database 52, and applies the patch into the committed database 48.

Figure 5:
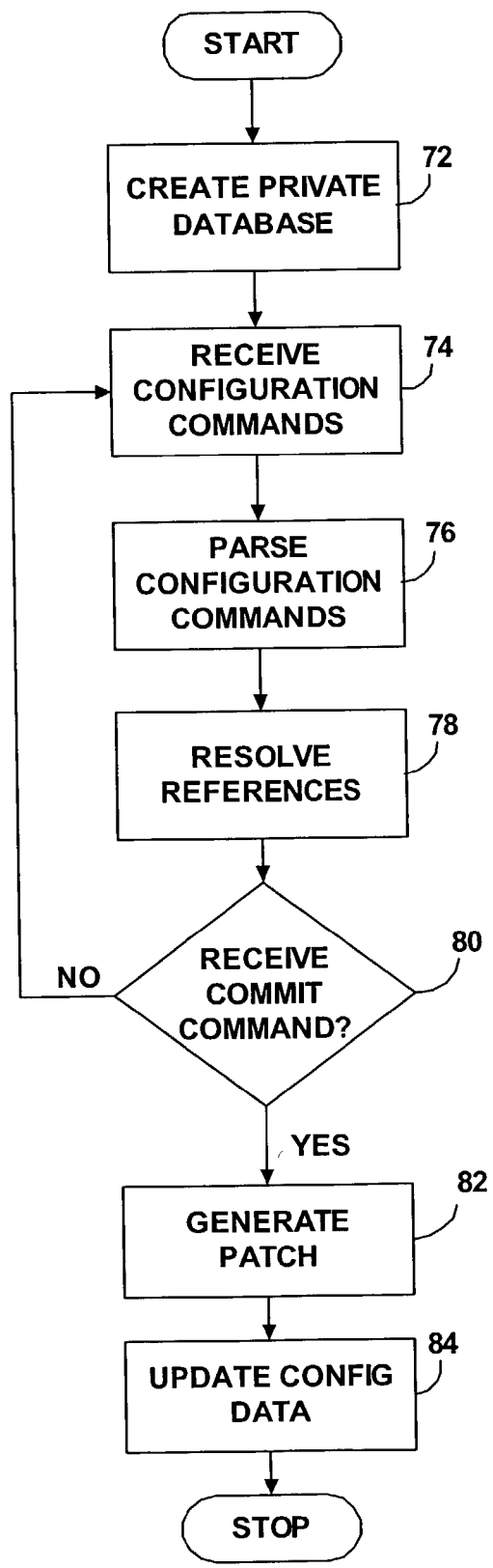
FIG. 5 is a flowchart illustrating a management module operating in a private configure mode in response to receiving a configure private command.

FIG. 5 is a flowchart illustrating management module 42 operating in a private configure mode in response to receiving a configure private command. In response, management module 42 creates a private database 52 for the requesting client 20 that issued the configure private command (72). As described, private database 52 may be a replicate of committed database 48 at the time the request is received. Alternatively, private database 52 may be a copy of configuration data in shared database 50. In addition, management module may make a corresponding copy of configuration text file 54, which may comprise an ASCII file, at the time of the request.

Next, client 20 may edit the configuration data of private database 52 by issuing one or more configuration commands to management module 42 (74). Private database 52 allows client 20 to edit data without interference from other clients 20 who may also be editing the configuration of router 24. For example, if client 20 issues a rollback command, the configuration data of the respective private database 52 may be updated with a current copy of configuration data from committed database 48. Meanwhile, the edited configuration data of a private database 52 associated with another one of clients 20 remains unchanged.

Management module 42 may parse the configuration commands input from client 20, and resolve the references to appropriately configure router 24 (76, 78). Management module 42 waits to receive a commit command that indicates the completion of editing of private database 52 (80). When a commit command has not been received from client 20, management module 42 continues to receive configuration commands. However, upon receiving a commit command, management module 42 generates a patch representing the changes to private database 52, and applies the patch to committed database 48 (82, 84). Once the configuration data of committed database 48 is updated, router 24 may begin to operate in accordance with the new configuration data.

Figure 6:
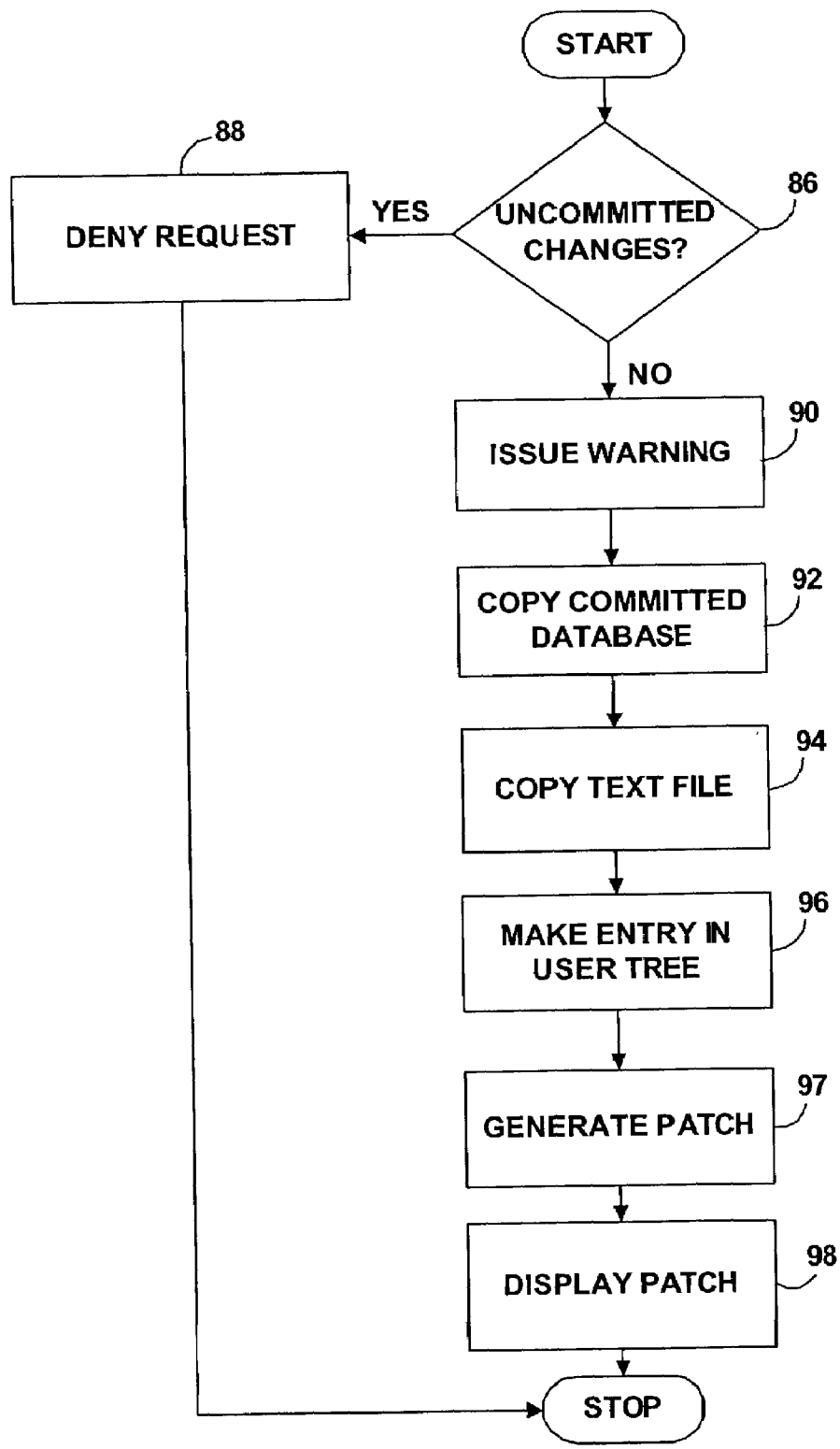
FIG. 6 is a flowchart illustrating a management module creating a private configuration database when operating in a private configure mode.

FIG. 6 is a flow chart illustrating management module 42 creating a private configuration database 52 when operating in a private configure mode. In response to receiving a configure private command, management module 42 verifies that shared database 50 does not contain any uncommitted changes (86). Shared database 50 may contain uncommitted changes if another one of clients 20 is in the process of editing configuration information. If shared database 50 contains uncommitted changes, management module 42 does not permit client 20 to enter into the private configuration mode. In that case, client 20 may need to wait until shared database 50 is unmodified before entering a private configure mode (88).

If shared database 50 does not contain any uncommitted changes, management module 42 may issue a warning to client 20 that any uncommitted changes to private database 52 will be discarded (90). Uncommitted changes may be discarded upon exiting private configuration mode, or on a time-out basis. For example, if client 20 leaves the private configuration mode unattended for more than ten minutes, management module may discard private database 52 along with its changes. Alternatively, private configuration mode may not discard uncommitted changes. In that case, management module 42 may, for example, allow client 20 to enter a private configuration mode, make changes to the respective private database 52, and exit the private configuration mode without discarding the changes made by client 20. Client 20 may then enter a private configuration mode later to continue making changes to the respective private database 52.

Management module 42 copies the configuration data of committed database 48 to private database 52 (92). Furthermore, management module 42 may generate a copy of text file 54 that may contain configuration data used by management module 42 during restart. (94). An entry may be made in the user tree of shared database 50 indicating that a private configuration mode is in session (96). Client 20 may edit the configuration data of private database 52 by issue one or more configuration commands to add new settings to the current configuration of router 24, delete or modify existing settings of the current configuration, or combinations thereof. Client 20 may issue a show|compare command directing management module 42 to generate a patch consisting of the differences between the configuration data of private database 52 and the copy of text file 54 (97). Management module 42 may further display to client 20 the generated patch (98). Client 20 may save the patch, and load the patch at another time. For example, the pseudocode below illustrates the exemplary use of the show|compare command in accordance with the invention.

user@host> configure private
    user@host # set system host-name Bob
    user@host # show|compare
    [edit system]
    – host-name Fred
    + host-name Bob In the above pseudocode client 20 issues a configure private command directing management module to operate in a private configuration mode. While in the private configuration mode, client 20 then issues a command to modify the current host name of router 24, i.e., set system hostname. Finally, client 20 issues a show|compare command directing management module 42 to generate a patch. Management module 42 merges the edited configuration data of the respective private database 52 with the copy of text file 54 to generate a patch, and may display the patch to client 20 as shown above. The patch indicates that host name Fred, the current host name of the system, is being removed (hence the minus sign in front of it) and the host-name Bob is being added (the plus sign in front of it).

Figure 7:
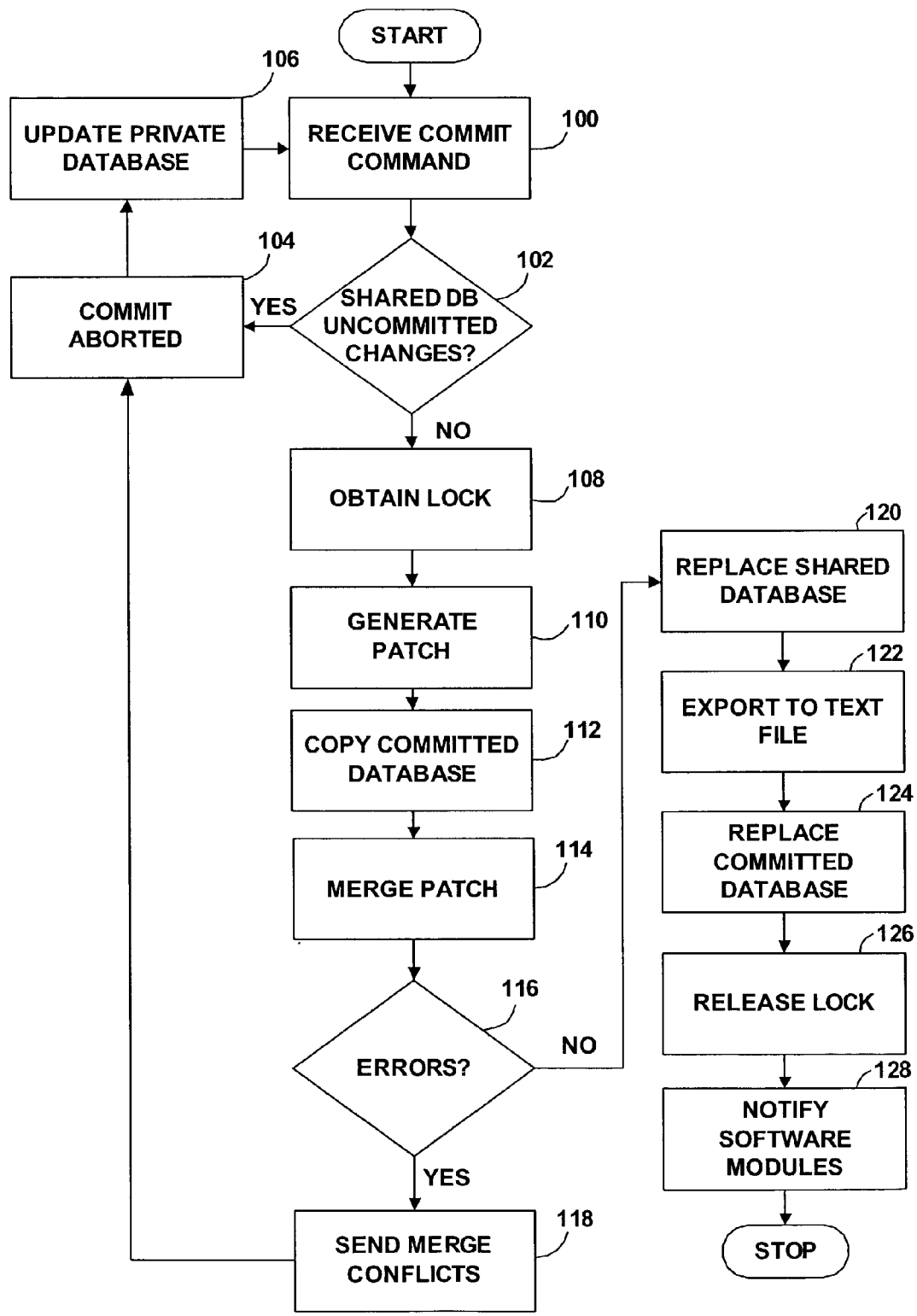
FIG. 7 is a flowchart illustrating a management module updating the configuration of a router in response to a commit command while in a private configuration mode.

FIG. 7 is a flow chart illustrating management module 42 updating the configuration of router 24 in response to a commit command while in a private configuration mode. Management module 42 receives a commit command from client 20 indicates the completion of editing configuration data of private database 52 (100). Management module 42 determines whether shared database 50 contains uncommitted changes (102). When shared database 50 contains uncommitted changes, the commit is aborted (104). Client 20 may wait until shared database 50 is no longer in the process of being edited, and issue a update command. The update command directs management module 42 to merge changes made by client 20 in private database 52 with a copy of the most recent committed database 48 (106). In this manner, the changes made to private database 48 by client 20 are not lost. Alternatively, management module 42 may automatically merge private changes made by client 20 with a copy of the most recent committed database 48 upon aborting a commit. Client 20 may review the changes to ensure correctness, and issue another commit command. Client 20 may also add or remove changes to private database 52 before issuing another commit command. Furthermore, client 20 may issue a rollback command, which discards changes made, and loads private database 52 with a fresh copy of committed database 48.

When shared database 50 does not contain uncommitted changes, management module 42 locks shared database 50 (108). The lock prevents other of clients 20 from editing shared database 50 while manage module 42 is responding to the commit command. Having locked shared database 50, management module 42 may proceed to generate a patch by merging the changes made to private database 52 with the copy of text file 54 (110).

Management module 42 may make a copy of committed database 48, and apply the patch to the copy of committed database 48 (112, 114). Parts of the configuration data of committed database 48 that are unchanged by client 20 remain as configuration information that router 24 operates in accordance with. For example, if client 20 only changed the host name in private database 52 (shown in pseudocode above), the copy of committed database 48 would remain unchanged except for the host name changing from Fred to Bob.

Management module 42 may check to see if the copy of committed database 48 with the patch merged in, referred to herein as the temporary configuration database, contains any errors (116). Errors may include merging conflicts or configuration data not conforming to schema 56. When the temporary configuration database does contain errors, a merge conflict may be sent to client 20, and the commit is aborted (118, 104). The merge conflict may indicate any errors that occurred in merging committed database 48 with the patch. The merge conflict may also indicate whether the temporary configuration database contains any conforming errors, such as syntax errors. In the case of a merge conflict, management module 42 may automatically update private database 48 to correct the conflict while still retaining any changes made by client 20 (106). Alternatively, client 20 may issue an update command in response to a merge conflict. The pseudocode below illustrates an exemplary use of the update command in accordance with the invention.

user@host> configure private
user@host# set system host-name Bob
user@host# show|compare
[edit system]
− host-name Fred
+ host-name Bob
user@host# commit
'host-name Roy'
statement does not match patch; 'Roy'!='Fred'
load complete (1 errors)
user@host# update
user@host# show|compare
[edit system]
− host-name Roy
+ host-name Bob In the above pseudocode, client 20 issues a configure private command directing management module to operate in a private configuration mode. While in the private configuration mode, client 20 then issues a command to modify the current host name of router 24, i.e., set system hostname, to Bob. Client 20 issues a show|compare command directing management module 42 to generate a patch. Management module 42 generates a patch and may display it to client 20 as shown above. The patch indicates that host name Fred, the current host name of the system in private database 52, is being removed and the host-name Bob is being added. However, upon client 20 issuing a commit command to direct router 24 to verify and accept the change, an indication reveals that an error has occurred. The error states that the current host name of committed database 48 is Roy, not Fred. Another one of clients 20 may have issued a commit changing the host name to from Fred to Roy after client 20 began the configure private session. Client 20 issues an update command that directs management module 42 to load the changes made by client 20 into a new copy of committed database 48. Alternatively, management module 42 may automatically update private database 52 with a new copy of committed database 38 with changes loaded in. Upon issuing another show|compare command, the patch indicates that the host name will be changed from Roy to Bob.

When the temporary configuration database contains no errors, the configuration data of the temporary configuration database may replace the configuration data of shared database 50 (120). The configuration data of the temporary configuration database may further be exported to text file 56 and replaces the current information in text file 56 (122). Furthermore, the configuration data of temporary configuration database may replace the configuration data of committed database 48 (124). The configuration data being replaced in committed database 48 may be saved to allow a client 20 to issue a rollback. Upon completion of replacing configuration data in shared database 50, text file 54, and committed database 48, management module 42 releases the lock on shared database 50 (126).

Management module 42 notifies existing software modules 46 that an updated version of configuration data is located in committed database 48 (128). Software modules 46 retrieve the new configuration information from committed database 48 and router 24 begins to operate in accordance with the updated configuration data.

Figure 8:
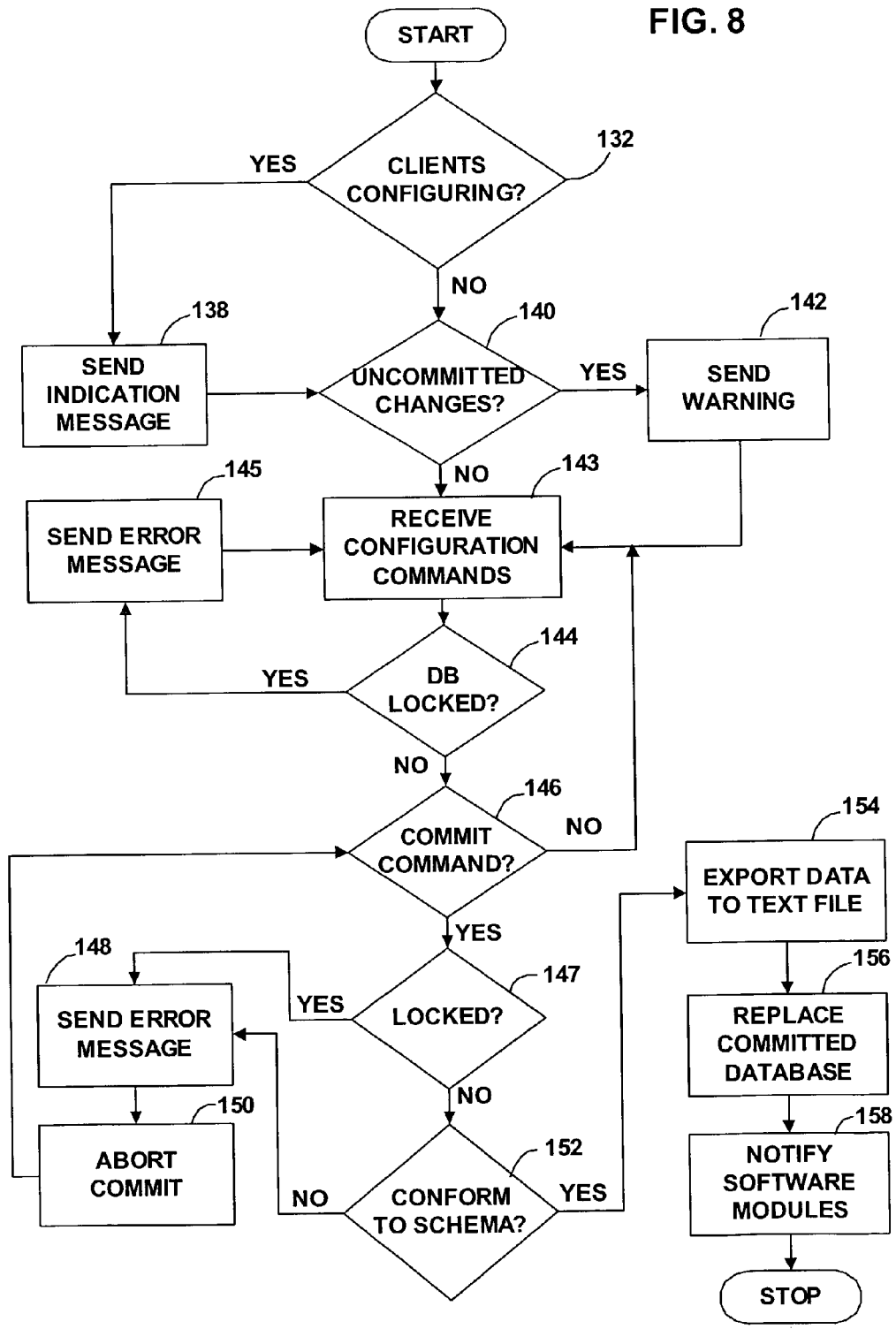
FIG. 8 is a flowchart illustrating a management module operating in a default configure mode in response to receiving a configure command.

FIG. 8 is a flow chart illustrating management module 42 operating in a default configure mode in response to receiving a configure command. In response to receiving a configure command that does not include additional parameters that specify a particular configuration mode, management module 42 determines whether other clients 20 are currently configuring router 24 (132). When other clients 20 are currently configuring router 24, management module 42 indicates to requesting client 20 a message to inform client 20 that there is currently another one of clients 20 configuring router 24 (138). The indication message may further inform client 20 the identity of other clients 20, the portion of configuration data that other clients 20 are viewing or editing, the time that other clients 20 logged into the configuration mode, and the like.

Upon sending the indication message to client 20, or if no other clients 20 are currently configuring router 24, management module 42 validates whether shared database 50 contains uncommitted changes (140). When shared database 50 contains uncommitted changes, a warning is sent to inform client 20 that there are uncommitted changes to shared database 36 (142). For example, the pseudocode below further illustrates these steps.

user@host> configure
Current configuration users:
user2 terminal p3 (pid 1088) on since 2002-05-14 01:02:27 CST
[edit interfaces so-3/0/0 unit 0 family inet]
The configuration has been changed but not committed
user@host>

In the above pseudocode, client 20 issues a configure command. Management module operates in a default configuration mode since the configure command contains no additional parameters indicating a specific configuration mode. Management module 42 indicates that another one of clients 20 is currently in the default configure mode. In the example above, only one other of clients 20, user2 at terminal p3 (bid 1088), is currently in the default configuration mode. User2 is editing interface so-3/0/0 unit 0 family inet. Management module 42 further warns client 20 that shared database contains uncommitted changes.

Once in the configure mode, management module 42 receives configuration commands from requesting client 20, and determines whether shared database 50 is locked (143, 144). Shared database 50 may be locked when another of clients 20 is in the exclusive configuration mode or committing changes in the private configuration mode. Requesting client 20 may continue issuing configuration commands as long as shared database 50 remains unlocked. When shared database 50 becomes locked, management module 42 forbids client 20 from issuing configuration commands. When client 20 attempts to issue configuration commands while shared database 50 is locked an error message is sent to client 20 indicating that another of clients 20 currently has a lock on shared database 50 (145).

Management module 42 waits to receive a commit command that indicates the completion of editing of private database 52 (146). When a commit command has not been received from client 20, management module 42 continues to receive configuration commands. However, upon receiving a commit command, management module 42 determines whether any of clients 20 has a lock on shared database 50 (147). When one of clients 20 has a lock on shared database 50, management module 42 will inform client 20 of the lock another client 20 has on shared database 50 (148). The commit command issued by client 20 may be aborted (150). Client 20 may wait until the other client 20 releases the lock on shared database 50, and then issue another commit command. Alternatively, management module 42 may not abort the commit command issued by client, but instead management module may wait for the other client 20 to release the lock on shared database 50, and then proceed with the commit process.

When client 20 issues a commit command, all changes made to the configuration data of shared database 50, complete or incomplete, are committed. Furthermore, client 20 may issue a rollback command. The rollback command discards all the changes made to shared database 50, not just changes made by the issuer of the rollback command.

When shared database 50 is unlocked, management module 42 determines whether the updated configuration conforms to schema 56 (152). When the updated configuration does not conform to schema 56, management module 42 informs client 20 that configuration data does not follow proper syntax, and aborts the commit command (148, 150). Management module 42 may further indicate where the error occurs in the configuration data. Client 20 may fix the errors and issue another commit command. Alternatively, management module 42 may automatically correct errors to the edited shared database 50. Client 20 may review the automatic error revisions and issue another commit command.

When the updated configuration conforms to schema 56, management module 42 may export the configuration data to text file 54 (154). Furthermore, the updated configuration data may replace the existing configuration data of committed database 48 (156). Management module 42 may save the replaced configuration data in committed database 48 to allow for clients 20 to issue a rollback command. Management module 42 notifies existing software modules 46 of the updated configuration data located in committed database 48 (158). Existing software modules 46 retrieve the updated configuration data from committed database 48 and router 24 begins to operate in accordance with the new configuration data.

Figure 9:
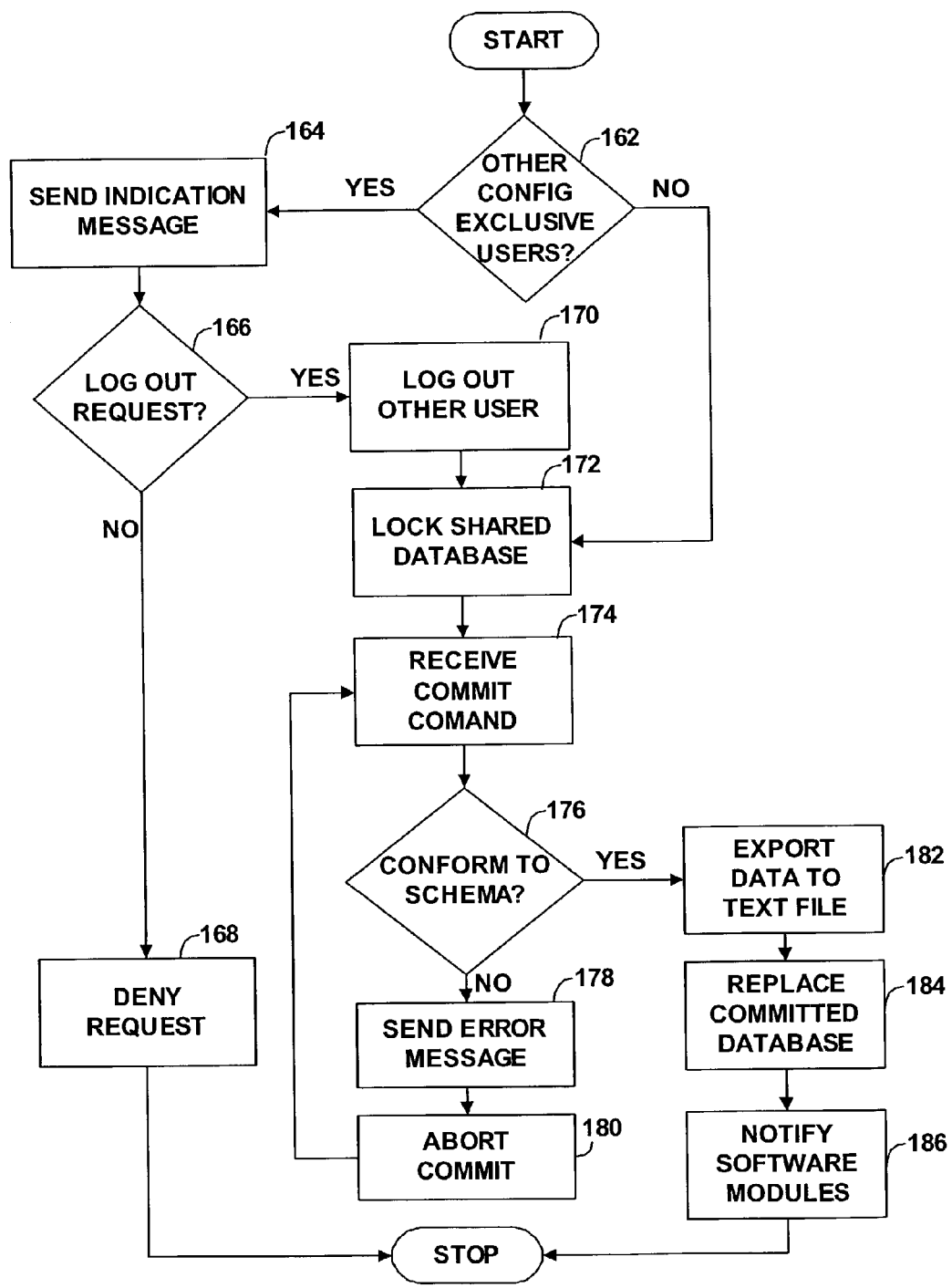
FIG. 9 is a flowchart illustrating a management module operating in an exclusive configure mode in response to receiving a configure exclusive command.

FIG. 9 is a flowchart illustrating management module 42 operating in an exclusive configure mode in response to receiving a configure exclusive command. In response to a configure exclusive command, management module 42 determines whether any clients 20 are currently in an exclusive configuration mode (162). When another one of clients 20 is currently in the exclusive configuration mode, management module 42 informs client 20 that another one of clients 20 is in the exclusive configuration mode (164). Management module 42 may further inform client 20 of the identity of other clients 20, the portion of configuration data that other clients 20 are viewing or editing, the time that other clients 20 logged into the configuration mode, and the like. Client 20 may issue a logout command to forcibly log another one of clients 20 out of the exclusive configuration mode (166). When management module 42 does not receive a logout command, the request of client 20 to configure router 24 in the exclusive configuration mode is denied (168). In this manner, a syntax for the logout command may be expressed as follows:

request system log out [pid], where pid is the process identification of client 20 that is currently in the exclusive configuration mode.

When management module 42 receives a logout command from client 20, management module logs the other of clients 20 out of the exclusive configuration mode (170). After logging other clients 20 out, or if no other clients 20 are in the exclusive configuration mode, management module 42 places a lock on shared database 50 (172). Client 20 may edit the configuration data of shared database 50 without interference from any other of clients 20. Management module 42 may receive a commit command indicating the completion of editing shared database 50 (174). Management module 42, upon receiving a commit command from client 20, compares the updated configuration to schema 56 (176). When the updated configuration does not conform to schema 56 a management module 42 informs client 20 that there exists errors in the updated configuration, and aborts the commit (178, 180). Management module 42 may further indicate where the errors occur in the configuration information in order for client 20 to correct the errors. Alternatively, management module 42 may automatically correct the errors and display the corrections to client 20.

When the updated configuration conforms to schema 56, management module 42 exports the configuration data to text file 54 (182), and replaces the configuration data of committed database 48 with the updated configuration data (184). Further, management module 42 may save the configuration data being replaced may to allow for a user to issue a rollback command. Management module 42 notifies existing software modules 46 of the updated configuration data in committed database 48 (186). Software modules 46 retrieve the updated configuration data from committed database 48.

A number of embodiments of the present invention have been described. Nevertheless, it will be understood that various modifications may be made without departing from the spirit and scope of the invention.

The invention claimed is:

1. A method comprising:

storing current configuration data for operating a network device in a first data source of the network device;

maintaining a second data source on the network device that stores a copy of the configuration data of the first data source;

allowing a first plurality of clients to concurrently edit the configuration data of the second data source over a network;

updating the configuration data of the first data source to reflect changes made to the configuration data of the second data source in response to a commit command from any of the first plurality of clients accessing the second data source, wherein the changes comprise all of the changes made to the second data source by the first plurality of clients;

receiving from a second plurality of clients commands transmitted over the network to configure the first data source in a private configuration mode;

creating for each client of the second plurality of clients a respective private data source on the network device that stores a copy of the configuration data of the first data source in response to the commands to configure in the private configuration mode, wherein each respective private data source of private data sources is edited by only one of the second plurality of clients; and updating the configuration data of the first data source to reflect changes made in one of the private data sources without updating the configuration data of the first data source with updates made to the second data source or any other ones of the private data sources upon receiving a commit commands from one of the second plurality of clients editing the one of the private data sources.

2. The method of claim 1, further comprising:

parsing the commands to identify a configuration mode parameter; and creating the private data sources in response to the commands that specify a private configuration mode.

3. The method of claim 1, wherein updating the first data source to reflect the updates made in the one of the private data sources includes:

identifying differences between the one of the private data sources and the first data source; and updating the first data source in accordance with the identified differences.

4. The method of claim 3, wherein identifying the differences includes comparing the configuration data of the one of the private data sources with a fourth data source that stores configuration data used at start up.

5. The method of claim 3, further comprising storing the identified differences between the one of the private data sources and the first data source.

6. The method of claim 3, further comprising locking the second data source in response to the commit command from the one of the second plurality of clients editing the one of the private data sources.

7. The method of claim 1, wherein creating the private data sources from the first data source includes copying the first data source for each of the private data sources.

8. The method of claim 1, further comprising:

storing configuration data used at start up in a fourth data source;

generating a copy of the fourth data source upon receiving the configuration command; and associating the copy of the fourth data source with the respective private data source.

9. The method of claim 1, further comprising:

receiving a commit command from one of the second plurality of clients editing one of the private data sources;

identifying any errors during the updating of the first data source;

aborting the update;

informing the one of the second plurality of clients of the errors; and automatically updating the errors in the one of the private data source.

10. The method of claim 1, further comprising:

comparing the configuration data of each private data source to a schema that stores a syntax to which configuration data of the private data sources must conform; and aborting the update in response to updated configuration data not conforming to the schema.

11. The method of claim 1, further comprising notifying a set of existing software modules of updated configuration data of the first data source.

12. The method of claim 11, further comprising the software modules retrieving updated configuration data from the first data source.

13. The method of claim 1, further comprising saving configuration data being replaced in the first data source.

14. The method of claim 1, further comprising:

receiving an update command from one of the second plurality of clients editing one of the private data sources;

copying the current first data source in response to the update command; and merging the edited data of the one of the private data sources into the copy of the first data source to refresh one of the private data sources.

15. The method of claim 1, further comprising:

receiving a rollback command from one of the second plurality of clients editing one of the private data sources;

discarding the changes made to configuration data of the one of the private data sources in response to the rollback command; and refreshing the one of the private data sources source with a copy of the first data source.

16. A method comprising:

receiving from a plurality of clients commands over a network to configure a first data source of the network device that stores current configuration data for operating a network device;

parsing the commands to identify a configuration mode;

allowing a first subset of the plurality of clients to edit configuration data of a second data source of the network device concurrently in response to commands that specify a default configuration mode, wherein the second data source store a copy of the configuration data of the first data source;

updating the configuration data of the first data source to reflect the updates made to the configuration data of the second data source in response to a commit command from any of the first subset of clients editing the second data source, wherein the changes comprise all of the changes made to the second data source by the first subset of clients;

creating, for a second subset of the plurality of clients, one or more private data sources on the network device that store a copy of the configuration data of the first data source in response to each of the commands that specifies a private configuration mode, wherein each of the one or more private data sources is associated and edited by only one client of the second subset of the plurality of clients; and updating the configuration data of the first data source to reflect the updates made in one of the private data sources without updating the configuration data of the first data source with updates made to the second data source or any other ones of the private data sources upon receiving a commit command from one of the clients of the second subset of clients editing the one of the private data sources.

17. The method of claim 16, further comprising:

locking the second data source in response to the commands that specify an exclusive configuration mode; and allowing only one of the plurality of clients to edit the configuration data of the second data source.

18. The method of claim 16, further comprising:
indicating in the second data source that a private configuration mode is in progress.

19. The method of claim 16, further comprising:
editing configuration data of the second data source; and
denying the command to configure the network device in the private configure mode in response to the second data source having uncommitted changes.

20. A computer-readable storage medium comprising instructions to cause a processor to:
store current configuration data for operating a network device in a first data source of the network device;
maintain a second data source of the network device that stores a copy of the configuration data of the first data source;
allow a first plurality of clients to concurrently edit the configuration data of the second data source over a network;
update the configuration data of the first data source to reflect changes made to the configuration data of the second data source in response to a commit command from any of the first plurality of clients accessing the second data source, wherein the changes comprise all of the changes made to the second data source by the first plurality of clients;
receive from a second plurality of clients commands transmitted over the network to configure the first data source in a private configuration mode;
create for each client of the second plurality of clients a respective private data source on the network device that stores a copy of the configuration data of the first data source in response to the commands to configure in the private configuration mode, wherein each respective private data source of private data sources is edited by only one of the second plurality of clients; and
updating the configuration data of the first data source to reflect changes made in one of the private data sources without updating the configuration data of the first data source with updates made to the second data source or any other ones of the private data sources upon receiving a commit commands from one of the second plurality of clients editing the one of the private data sources.

21. The computer-readable storage medium of claim 20, further comprising instructions to cause a processor to:
parse the configuration commands to identify a configuration parameter; and
create the private data sources in response to the commands that specify a private configuration mode.

22. The computer-readable storage medium of claim 20, further comprising instructions to cause a processor to:
store configuration data used at start up in a fourth data source;
identify any differences between the respective private data source and the fourth data source; and
update the first data source in accordance with the identified differences.

23. The computer-readable storage medium of claim 22, wherein identifying differences between the respective private data source and the fourth data source further comprises instructions to cause a processor to compare the configuration data of the private data source with fourth data source.

24. The computer-readable medium of claim 20, further comprising instructions to cause a processor to lock the second data source in response to the commit command from the one of the second plurality of clients editing the one of the private data sources.

25. The computer-readable storage medium of claim 20, further comprising instructions to cause a processor to:
generate a copy of the first data source for each private data source, upon receiving the configuration command;
generate a copy of a fourth data source that stores configuration data used at start up upon receiving the configuration command; and
associate the copy of the fourth data source with the respective private data source.

26. The computer-readable storage medium of claim 20, further comprising instructions to cause a processor to:
compare the configuration data of each private data source to a schema that stores a syntax to which configuration data of the private data sources must conform; and
abort the merge in response to updated configuration data not conforming to the schema.

27. A method comprising:
storing current configuration data for operating a network device in a first data source of the network device;
maintaining a second data source on the network device that stores a copy of the configuration data of the first data source;
allowing a first plurality of clients to concurrently edit the configuration data of the second data source over a network;
updating the configuration data of the first data source to reflect changes made to the configuration data of the second data source in response to a commit command from any of the first plurality of clients accessing the second data source, wherein the changes comprise all of the changes made to the second data source by the first plurality of clients;
creating a third data source on the network device that stores a copy of the configuration data of the first data source, wherein the third data source is edited by only a single client of a second plurality of clients over the network;
inputting configuration data from the single client associated with the third data source;
maintaining a fourth data source on the network device that stores configuration data for use at start up;
comparing the configuration data of the third data source with the configuration data of the fourth data source in response to a commit command from the single client accessing the third data source to identify differences; and
updating the configuration data of the first data source with the identified differences.

28. A system comprising:
a first data source on a network device that stores current configuration data for operating a network device;
a second data source on the network device that stores a copy of the committed data source, wherein a plurality of clients concurrently edit the configuration data of the second data source over a network;
at least one private data source that stores a copy of the configuration data of first data source, wherein only a single client issues one more commands over the network to edit the configuration data of the private data source; and
a management module that updates the configuration data of the first data source to reflect the updates made to the configuration data of the second data source in response to a commit command from any of the plurality of clients editing the second data source, wherein the updates comprise all of the updates made to the second data source by the plurality of clients, and updates the configuration data of the first data source to reflect the updates made in the private data source without updating the configuration data of the first data source with updates made to the second data source or any other private data source in response to receiving a commit command from the single client editing the private data source.

29. The system of claim 28, further comprising a set of data that represents the comparison of the configuration data of the private data source with the configuration data of the committed data source.

30. The system of claim 29, wherein the set of comparison data compares the private data source with a set of start up data.

31. The system of claim 28, further comprising a schema that describes a proper syntax to which configuration data must conform.

32. The system of claim 28, further comprising an interface to receive configuration data from a client.

33. The system of claim 28, further comprising a set of one or more software modules that receive notification of the updated configuration data, and retrieve the updated configuration data from the committed data source.

\* \* \* \* \*

UNITED STATES PATENT AND TRADEMARK OFFICE
CERTIFICATE OF CORRECTION

| | | |
|---|---|---|
| PATENT NO. | : 7,233,975 B1 | Page 1 of 1 |
| APPLICATION NO. | : 10/223813 | |
| DATED | : June 19, 2007 | |
| INVENTOR(S) | : Simon J. Gerraty et al. | |

It is certified that error appears in the above-identified patent and that said Letters Patent is hereby corrected as shown below:

On Column 15, line 16 (claim 1), "commands" should read --command--.

On Column 17, line 43 (claim 20), "commands" should read --command--.

Signed and Sealed this

Twenty-fifth Day of November, 2008

JON W. DUDAS
*Director of the United States Patent and Trademark Office*